US012077344B2

(12) United States Patent
Sergieva

(10) Patent No.: US 12,077,344 B2
(45) Date of Patent: Sep. 3, 2024

(54) ANTI-THEFT DELIVERY BAG

(71) Applicant: Veronika Sergieva, Harahan, LA (US)

(72) Inventor: Veronika Sergieva, Harahan, LA (US)

( * ) Notice: Subject to any disclaimer, the term of this patent is extended or adjusted under 35 U.S.C. 154(b) by 469 days.

(21) Appl. No.: 17/569,504

(22) Filed: Jan. 6, 2022

(65) Prior Publication Data

US 2023/0211926 A1 Jul. 6, 2023

(51) Int. Cl.

| | |
|---|---|
| ***E05B 73/00*** | (2006.01) |
| ***B65D 33/25*** | (2006.01) |
| ***B65D 55/02*** | (2006.01) |

(52) U.S. Cl.

CPC ......... *B65D 33/2589* (2020.05); *B65D 55/02* (2013.01); *E05B 73/0017* (2013.01)

(58) Field of Classification Search

CPC ..... B65D 33/2589; B65D 55/02; E05B 73/00; E05B 73/0017

USPC ...................................................... 70/63, 209

See application file for complete search history.

(56) References Cited

U.S. PATENT DOCUMENTS

| | | | | |
|---|---|---|---|---|
| 7,257,972 | B2 * | 8/2007 | Bright | E05B 73/00 206/362.1 |
| 10,653,261 | B2 * | 5/2020 | Loures | E05B 67/383 |
| 10,743,694 | B2 * | 8/2020 | Raphael | A47G 29/141 |
| 10,786,103 | B2 * | 9/2020 | Teoh | B65D 11/1853 |
| 10,869,570 | B2 * | 12/2020 | Dunkelberger | A44B 19/30 |
| 10,932,602 | B2 * | 3/2021 | Hauck | A47G 29/12095 |
| 11,412,876 | B1 * | 8/2022 | Kadlub | A47G 29/20 |
| 2018/0202199 | A1 * | 7/2018 | Critz | E05B 73/0005 |
| 2020/0060460 | A1 * | 2/2020 | Farrar | A47G 29/141 |

* cited by examiner

*Primary Examiner* — Suzanne L Barrett

(74) *Attorney, Agent, or Firm* — My Patent Guys; Christopher Pilling

(57) ABSTRACT

An anti-theft delivery bag includes a bag having a front side and a rear side, the front side having an opening providing access to an interior portion of the bag. A fastener mechanism is positioned along the opening, the fastener mechanism configured to alternate between an opened position providing access to the interior portion, and a closed position preventing access to the interior portion. A locking device is configured to lock the fastener mechanism in the closed position. A strap is configured to be positioned on a door handle. A configurable latch member is attached to the rear side of the bag. The latch member includes a rectangular frame configured to be positioned against a mortise plate within a door jamb of a door, such that the latch member and the anti-theft delivery bag are secured in position when the door is closed and locked preventing theft of the bag.

16 Claims, 10 Drawing Sheets

ANTI-THEFT DELIVERY BAG

CROSS-REFERENCE TO RELATED APPLICATIONS

N/A

BACKGROUND OF THE INVENTION

1. Field of the Invention

The present invention relates to theft deterrents but more particularly to an anti-theft delivery bag.

2. Description of Related Art

During the COVID-19 pandemic, deliveries of all kinds, including food and product goods, have reached record highs as more people prefer contactless deliveries for their ordered goods. Unfortunately, the rise in deliveries has resulted in an increase of theft. Often called "porch pirates," these thieves will steal packages and food deliveries before the rightful recipient has a chance to bring the items inside their dwelling. Security cameras, such as doorbell cameras, provide some deterrent, but offer no protection for the delivered item. Consequently, a solution is needed.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is an object of the invention to provide an anti-theft delivery bag that is configured to protect one or more delivered items from theft. It is another object of the invention to provide a device that allows a delivery to be made without special knowledge, keys, or other instructions from the courier. It is yet another object of the invention to provide an anti-theft delivery bag that is configurable with a variety of door types, jambs, and casings.

In order to do so, an anti-theft delivery bag is provided, comprising a bag having a front side and a rear side, the front side having an opening providing access to an interior portion of the bag; a fastener mechanism positioned along the opening, the fastener mechanism configured to alternate between an opened position, providing access to the interior portion, and a closed position, preventing access to the interior portion; a locking device configured to lock the fastener mechanism in the closed position; a strap configured to position the anti-theft delivery bag on a door handle; and a latch member attached to the rear side, the latch member having a rectangular frame configured to be positioned against a mortise plate within a door jamb of a door, such that the latch member and the anti-theft delivery bag are secured in position when the door is closed, preventing theft of the bag.

In one embodiment, the fastener mechanism is a zipper. In one embodiment, the locking device is a fingerprint lock. In one embodiment, the bag is constructed from a durable waterproof material resistant to cutting. In one embodiment, the latch member further comprises a mounting member configured to be fastened to the rear side of the bag; a horizontal member positioned between the mounting member and the rectangular frame, wherein the horizontal member is hingedly connected to the mounting member enabling 180 degree rotation in relation to the mounting member and 360 degree swivel around its axis. In another embodiment, the horizontal member comprises a distal member and a proximal member, wherein the distal member is angled 60 degrees from the plane of the proximal member. In another embodiment, the latch member further comprises a sleeve attached to an end of the distal member, wherein the sleeve is positioned around a vertical frame member of the rectangular member, enabling the horizontal member to travel up and down the vertical frame member. In yet another embodiment, the horizontal member comprises a distal member and a proximal member, wherein the proximal member is hingedly attached to the distal member and the distal member is hingedly attached to the rectangular frame. In one embodiment, a top frame member of the rectangular frame is configured to rest on a latch or deadbolt extending from the mortise plate of the door. In one embodiment, the latch member is constructed from steel.

In another aspect of the invention, an anti-theft delivery bag is provided, comprising a bag having a front side and a rear side, the front side having an opening providing access to an interior portion of the bag; a fastener mechanism positioned along the opening, the fastener mechanism configured to alternate between an opened position, providing access to the interior portion, and a closed position, preventing access to the interior portion; a locking device configured to lock the fastener mechanism in the closed position; a strap configured to position the anti-theft delivery bag on a door handle; a latch member attached to the rear side, the latch member having a rectangular frame and horizontal member, wherein the rectangular frame is configured to rest on a latch or deadbolt extending from a mortise plate within a door jamb of a door, such that the rectangular frame and the anti-theft delivery bag are secured in position when the door is closed, preventing theft of the bag; and the horizontal member is shaped and configurable to clear the door jamb.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide an anti-theft delivery bag.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. As used herein, the terms "about," "approximately," or "substantially" apply to all numeric values, whether or not explicitly indicated. These terms generally refer to a range of numbers that one skilled in the art would consider equivalent to the recited values (i.e., having the same function or result). In many instances these terms may include numbers that are rounded to the nearest significant figure. In other instances, these terms refer to positions or descriptions of referenced limitations of components.

Figure 1:
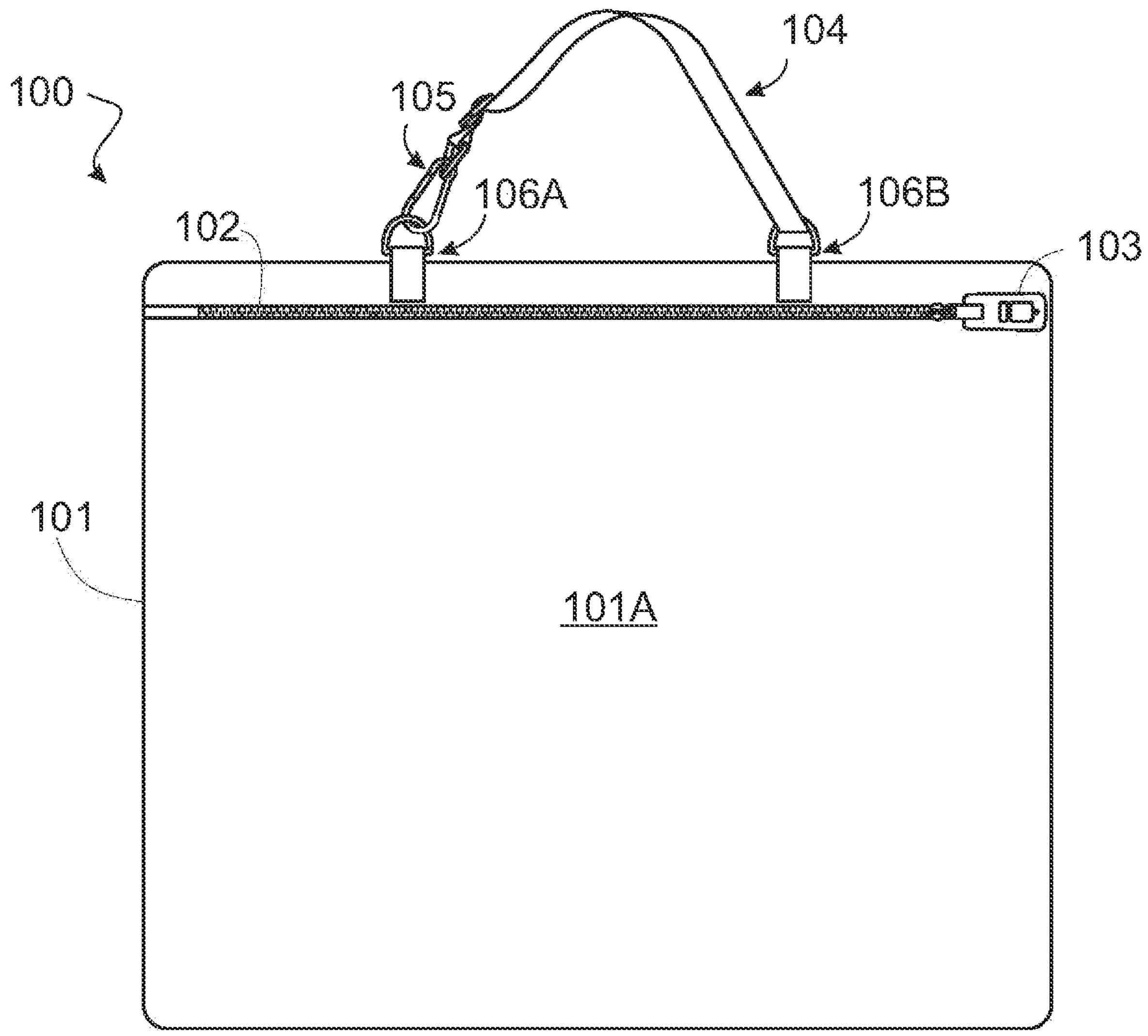
FIG. 1 is a front view of an anti-theft delivery bag according to an embodiment of the present invention.
Figure 2:
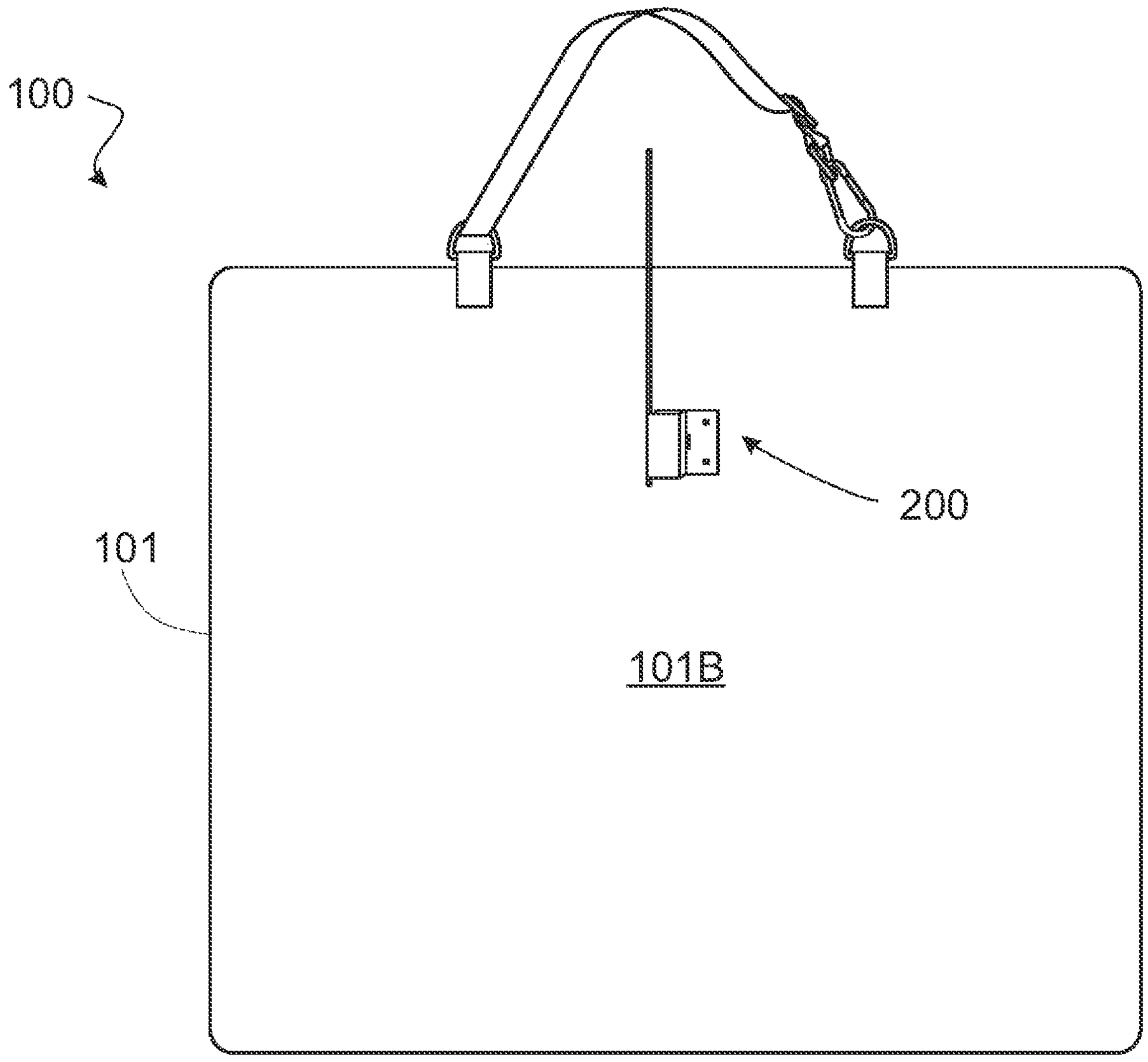
FIG. 2 is a rear view of the anti-theft delivery bag according to an embodiment of the present invention.
Figure 3A:
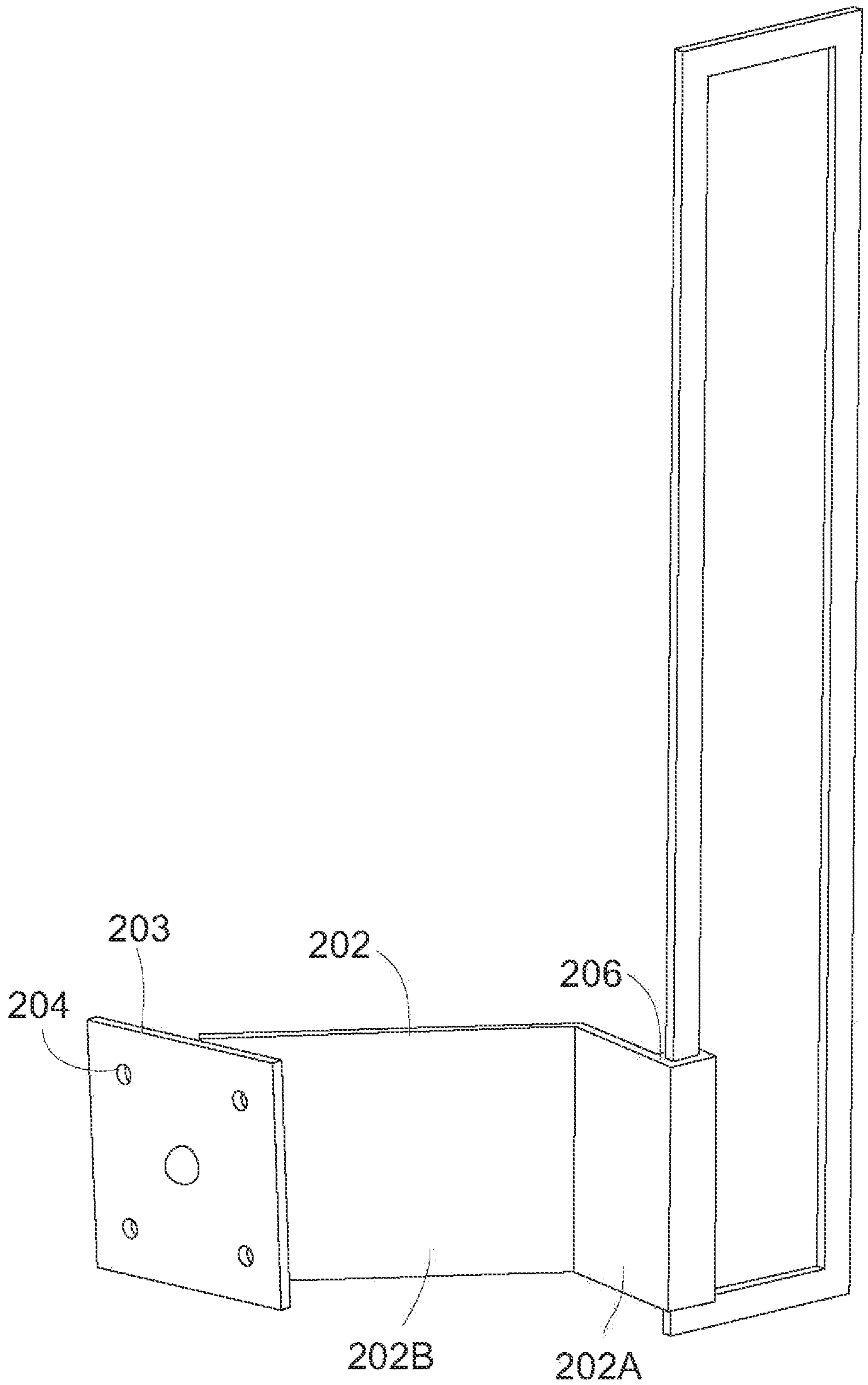
FIGS. 3A-D are perspective views of a latch member according to an embodiment of the present invention.
Figure 3B:
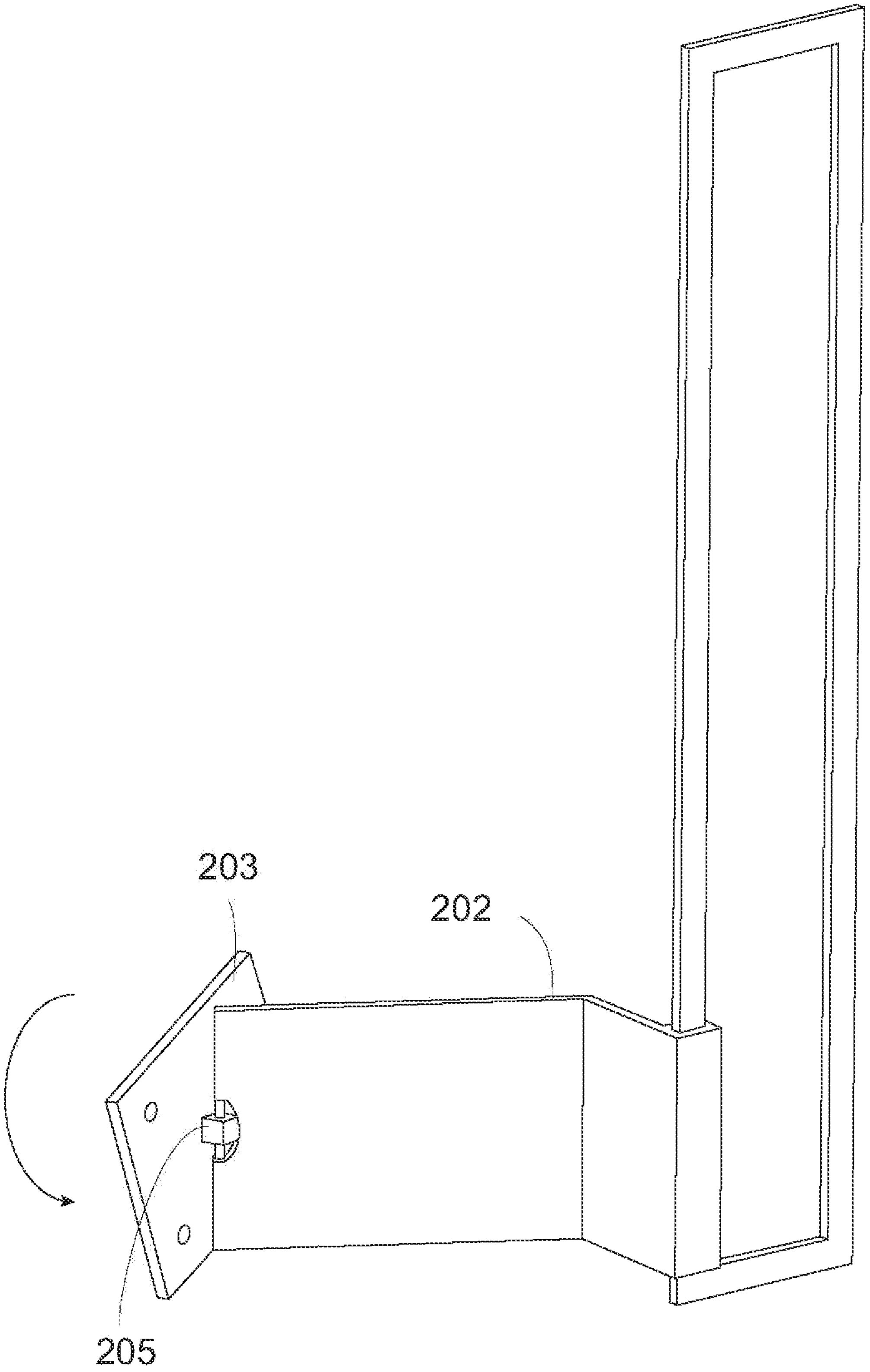
Figure 3C:
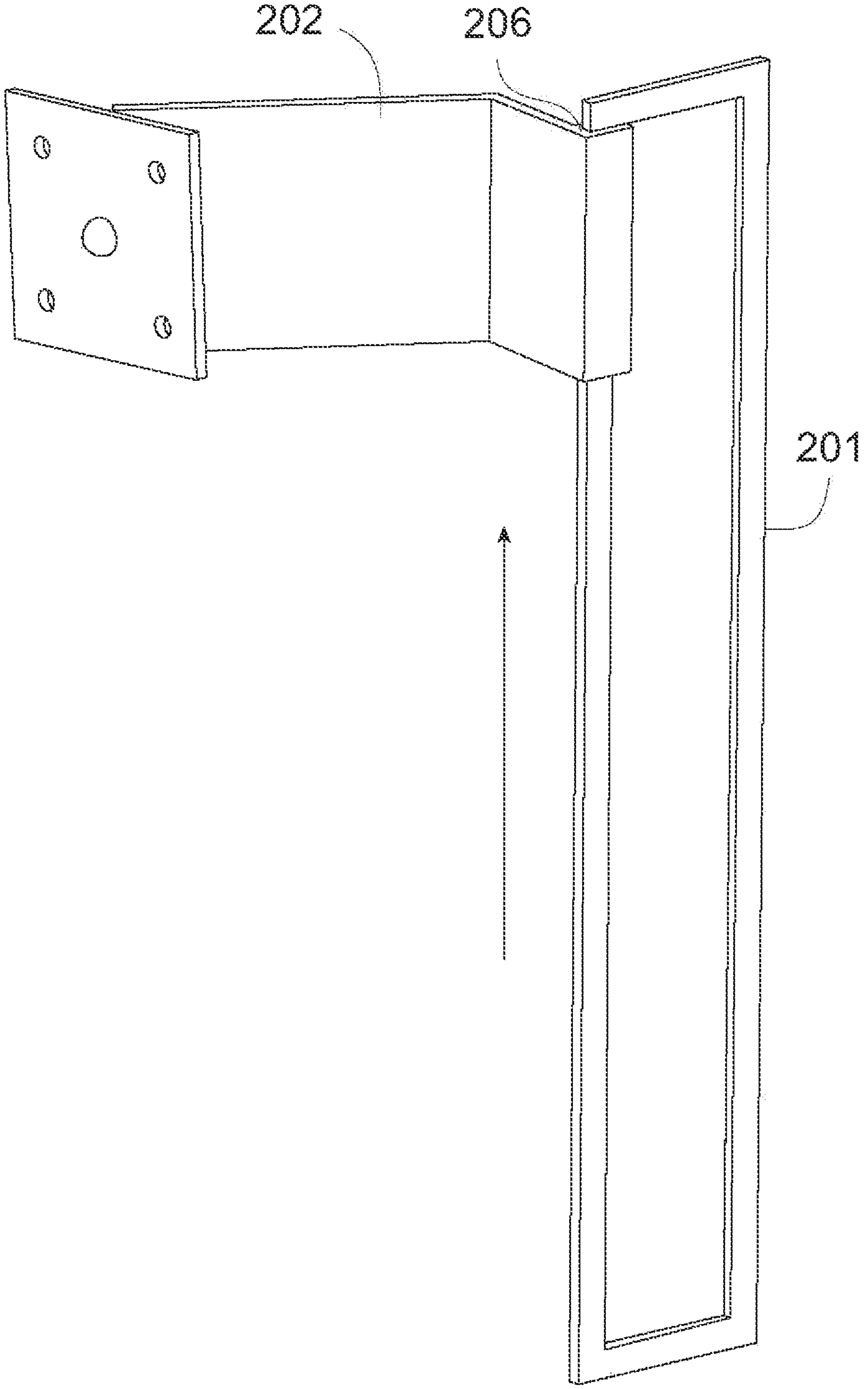
Figure 3D:
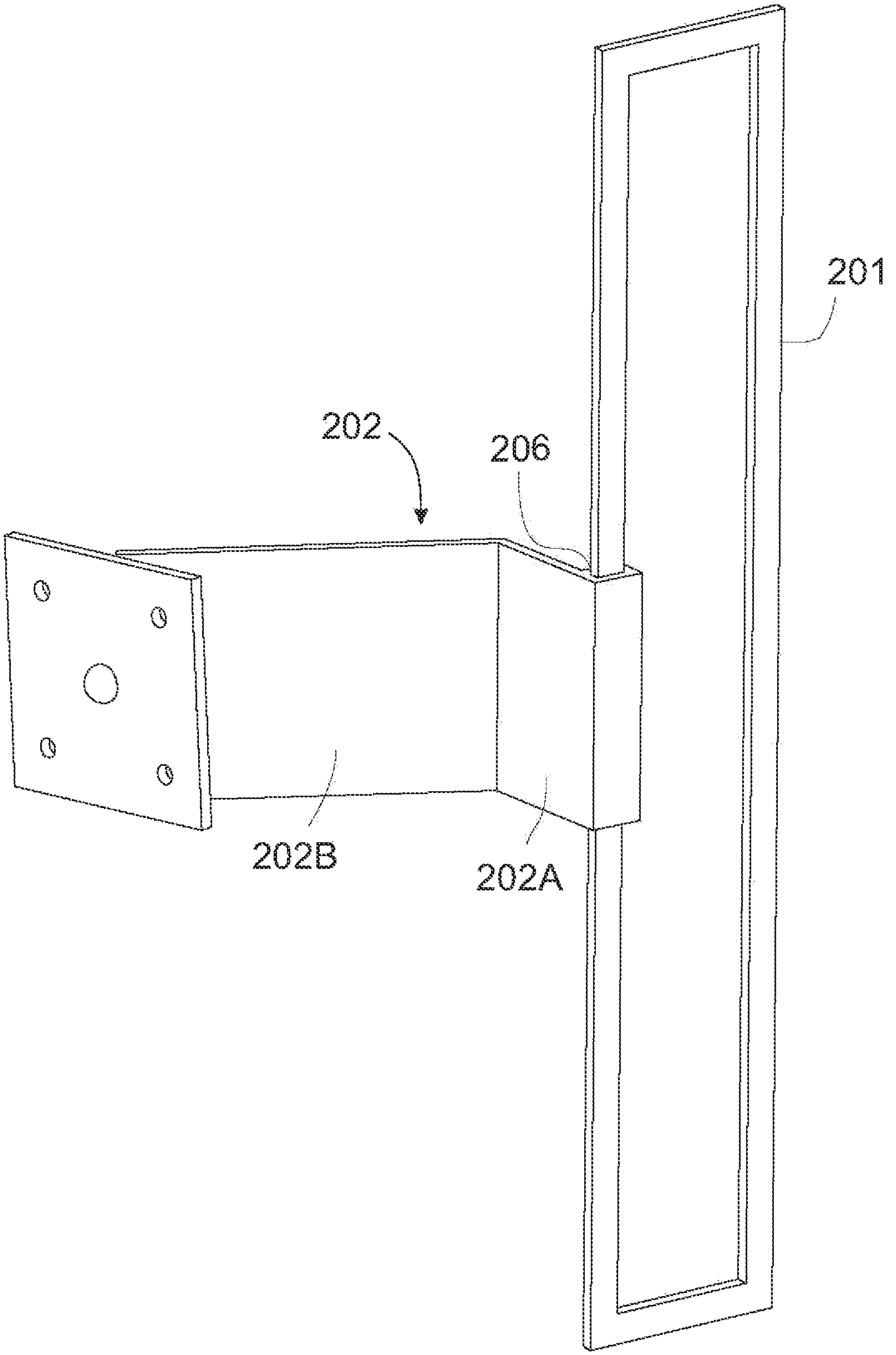

FIGS. 1-2 illustrate a front and rear view of an anti-theft delivery bag respectively, according to an embodiment of the present invention. Referring now to FIGS. 1-2, the anti-theft delivery bag 100 is illustrated. In one embodiment, the anti-theft delivery bag 100 comprises a rectangular bag 101 having a front side 101A and a rear side 101B. The rectangular bag has an opening providing access to an interior portion of the bag. In one embodiment, a fastening member 102 is provided along the opening to open and close the opening as is well known in the art. In one embodiment, the fastening member 102 is a zipper. A locking device 103 is provided to lock the fastening member in a closed position, preventing unauthorized access to the interior of the bag. It should be understood that other fastening members are possible, as long as the opening may be locked via a locking device. In one embodiment, the locking device is a fingerprint lock, requiring the fingerprint of the owner of the lock to release the lock. This is the preferred embodiment, as the fingerprint lock is configured to secure the zipper in the closed positioned with the teeth closed. In other embodiments, a similar locking device may be provided, including, but not limited to a combination lock, or other locking devices well known in the art.

Advantageously, the bag 101 is constructed from a durable waterproof material resistant to cutting. In one embodiment, the material is tarpaulin or similar material constructed of strong, flexible cloth, canvas, or polyester coated with polyurethane. In some embodiments, the bag is lined with steel mesh to prevent cutting. The size of the bag may vary, but the interior of the bag should be of sufficient size to retain a delivery, such as a package or food delivery. In some embodiments, the bag is insulated to keep food deliveries warm and/or cold. Multiple bag sizes may be offered to the consumer or one size may be available. Further, although a rectangular bag is preferred, multiple bag shapes may also be provided.

In one embodiment, a strap 104 is provided on a top portion of the bag. In one embodiment, the strap is attached to the bag via a first clasp 106A and a second clasp 106B. In some embodiments, a clip is provided 105, such as a carabiner clip, enabling the strap to be removably attached to the first clasp 106A. The use of these elements will be discussed in greater detail below.

In one embodiment, on the rear side 101B of the bag 101 a latch member 200 is provided. The latch member is configured to secure the invention to a door, such that the bag (and the delivered contents) is prevented from theft. In one embodiment, the latch member 200 is attached to the rear side of the bag in an upper central portion of the bag. The details and use of the latch member 200 will be discussed in greater details below.

FIGS. 3A-D and 6A-D are various views of the latch member according to an embodiment of the present invention. Referring now to FIGS. 3A-D and 6A-D, the latch member 200 is illustrated. In one embodiment, the latch member 200 comprises a rectangular frame member 201, a horizontal member 202, and a mounting plate 203. In one embodiment, the horizontal member 202 consists of a distal member 202A and a proximal member 202B, wherein the distal member is angled 60 degrees from the plane of the proximal member. In one embodiment, the mounting member 203 comprises fastening holes 204 enabling the mounting member 203 to be fastened to the rear side of the bag as illustrated in FIG. 2. In alternative embodiments, other fastening means may be provided to attach the mounting member 203 to the rear side of the bag. A hinge 205 is provided between the mounting member 203 and the proximal member 202B, wherein the hinge enables 180 degree rotation in relation to the mounting member and 360 degree swivel around its axis. In short, the proximal member may rotate to be parallel (and touch) the mounting member on each side of the proximal member's surface, as well as spin around its own axis. This enables the horizontal member to be configurable in a variety of positions in relation to the fixed mounting member 203 affixed to the rear side of the bag. Further, a sleeve 206 is attached to an end of the distal member 202A, wherein the sleeve is positioned around a vertical frame member of the rectangular member 201, enabling the horizontal member to travel up and down the vertical frame member. As one skilled in the art may appreciate, numerous configurations are possible.

Figure 4:
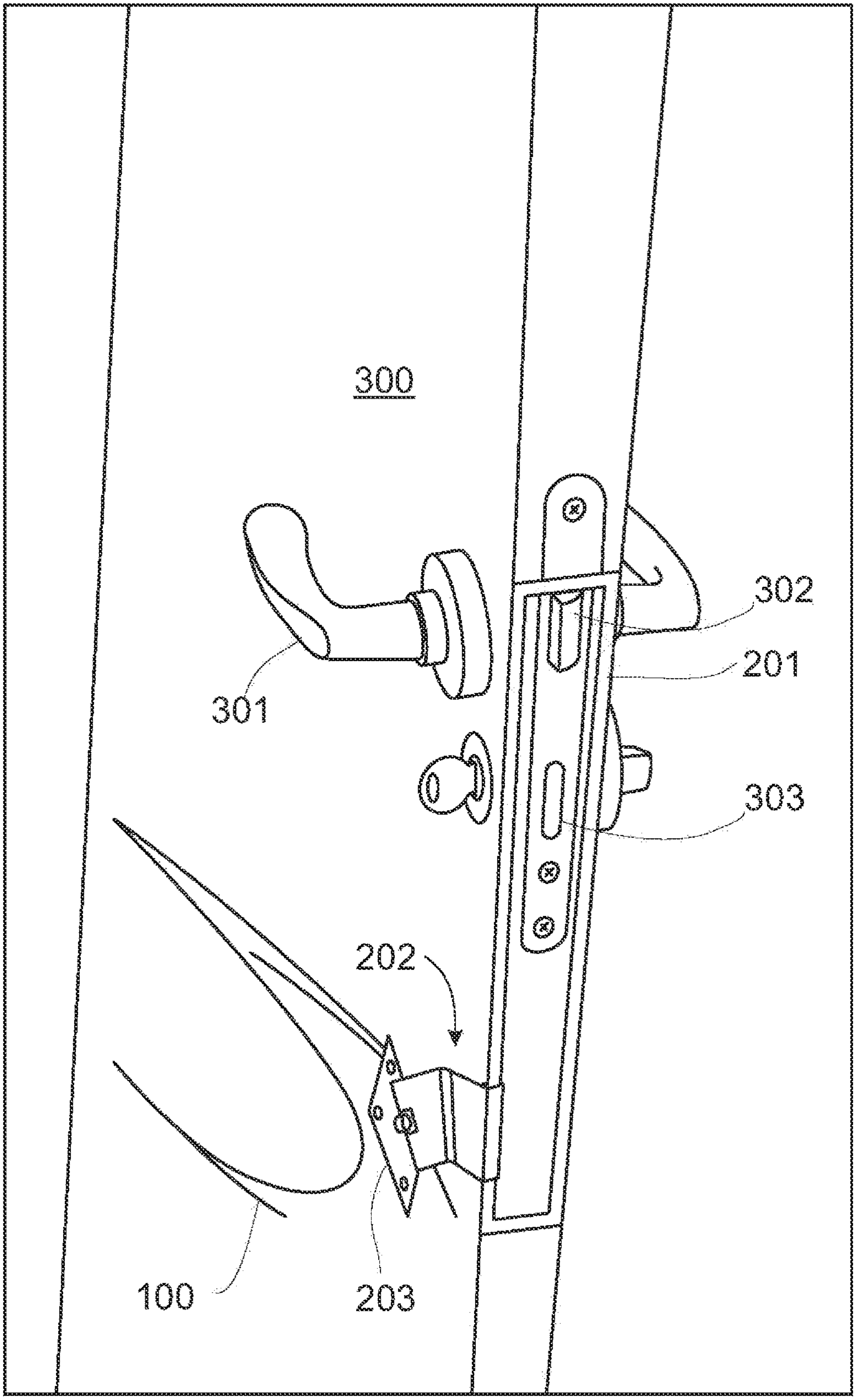
FIG. 4 is a perspective view of the latch member in position on a mortise lock plate on a door according to an embodiment of the present invention.

FIG. 4 is a perspective view of the latch member in position on a mortise lock plate on a door according to an embodiment of the present invention. Referring now to FIG. 4, the rectangular frame 201 is configured to be positioned within the doorjamb, such that the rectangular frame 201 rests on the mortise lock plate and rests on either the door latch 302 or deadbolt 303. In this example, the door latch is above the deadbolt, however in other embodiments, the deadbolt is above the door latch. During use, the rectangular frame member is positioned as illustrated, the door is closed, and the deadbolt is extended from the mortise lock, effectively securing the rectangular frame within the door jamb as long as the door remains closed and locked. Advantageously, the configurability of the latch member as previously discussed enables the horizontal member to clear the door jamb and any framing or casing provided on the door frame.

Figure 5:
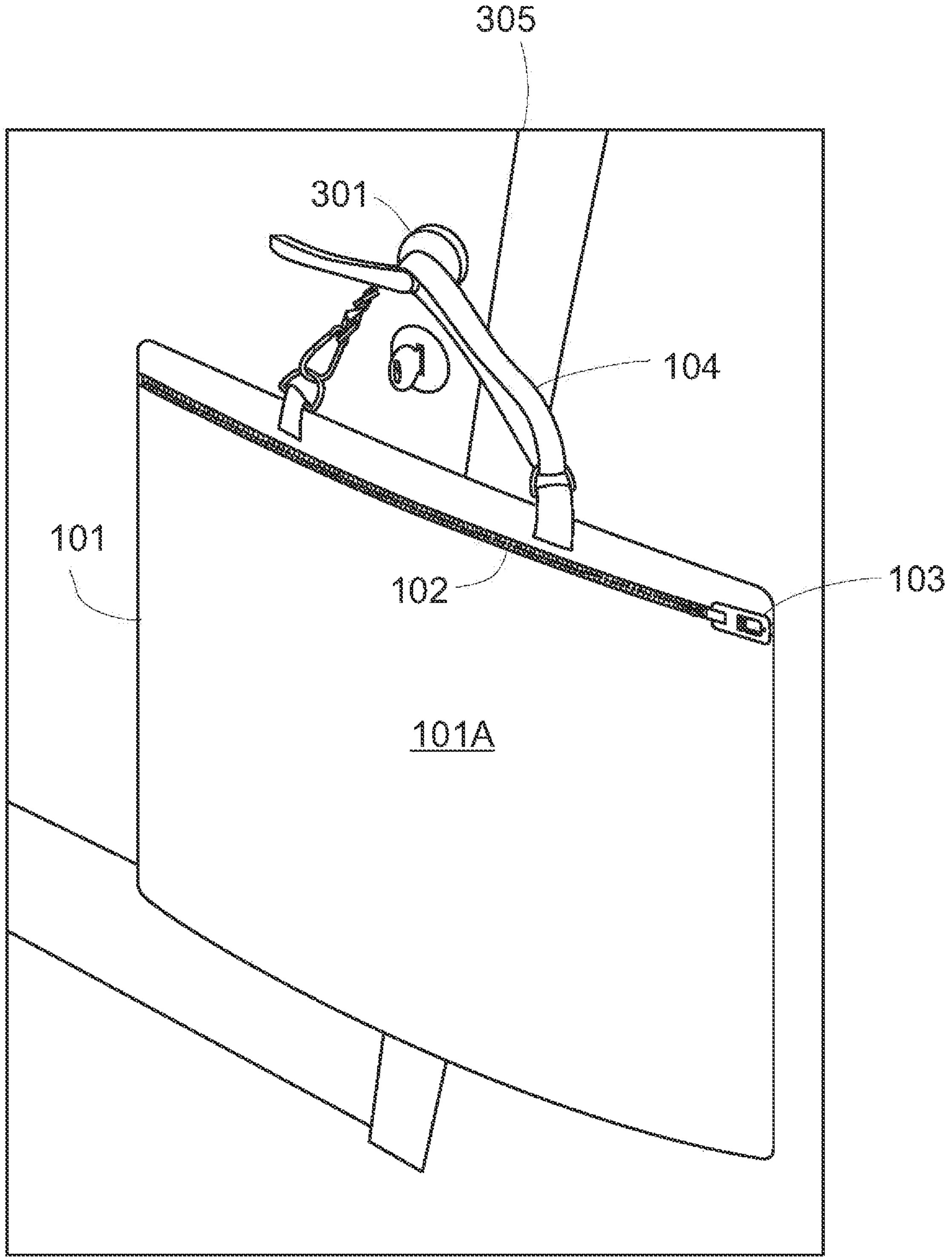
FIG. 5 is a perspective view of the anti-theft delivery bag installed and ready for use according to an embodiment of the present invention.
Figure 6A:
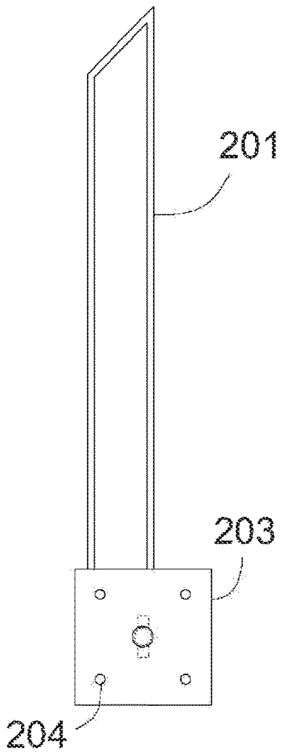
FIG. 6A is an angled view of the latch member of FIGS. 3A-D.
Figure 6B:
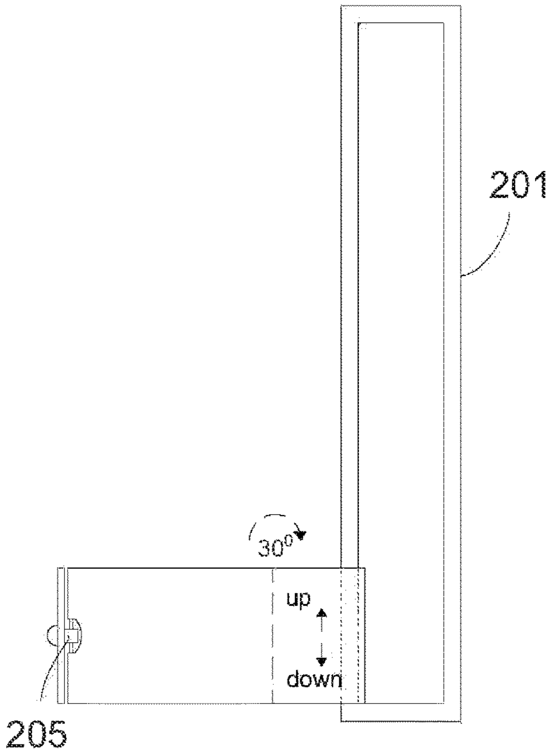
FIG. 6B is a front view of the latch member of FIGS. 3A-D.
Figure 6C:
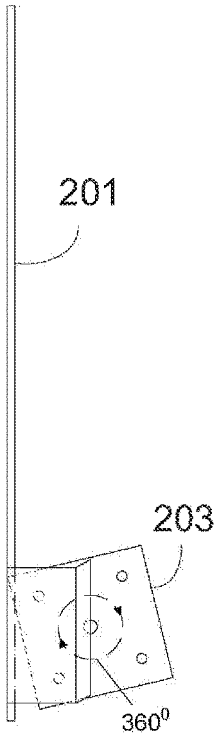
FIG. 6C is a side view of the latch member of FIGS. 3A-D.
Figure 6D:
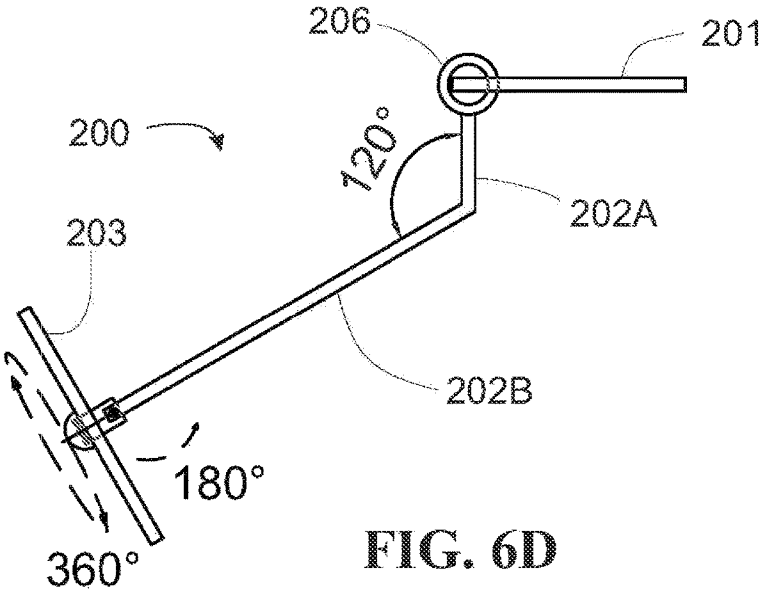
FIG. 6D is a top view of the latch member of FIGS. 3A-D.

FIG. 5 is a perspective view of the anti-theft delivery bag installed and ready for use according to an embodiment of the present invention. Referring now to FIG. 5, the rectangular frame of the latch member has been positioned as illustrated in FIG. 4, and the door is closed. Next, the strap should be placed and rested upon the exterior door handle 301 helping to bear the weight of the invention and any contents to be place inside. The fastening mechanism 102 should be in the opened positioned or the locking device 103 should be disengaged enabling the delivery person to place the contents within the interior portion of the bag. After the delivered contents are placed within the interior portion of the bag 101, the fastening mechanism 102 is closed, and the locking device 103 is engaged, such that the delivered contents are locked within the interior portion of the bag 101. Finally, the owner of the delivered contents may unlock the locking device 103, open the fastening mechanism 102, and retrieve the delivered contents from the interior portion of the bag 101. The strap 104 on the exterior handle bears the weight of the invention and contents when the rectangular frame member of the latch member is disengaged from the door jamb. In some embodiments, the front side 101A of the bag 101 may include text, pictures, or other instructions for the delivery person so they can properly use the invention.

Figure 7A:
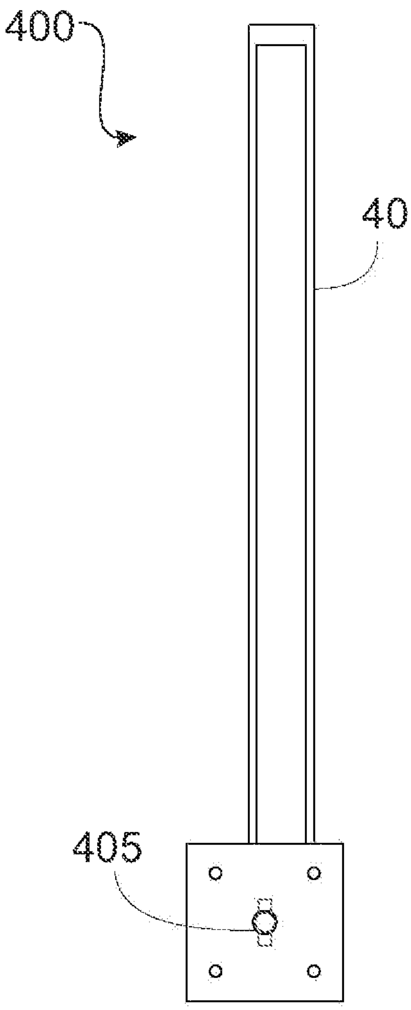
FIG. 7A is an angled view of an alternative latch member according to an embodiment of the present invention.
Figure 7B:
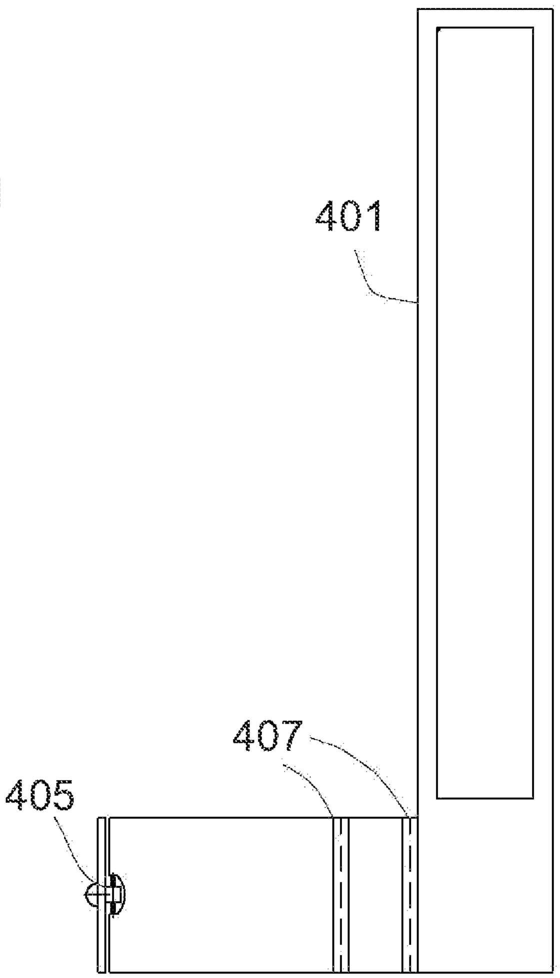
FIG. 7B is a front view of the alternative latch member according to an embodiment of the present invention.
Figure 7C:
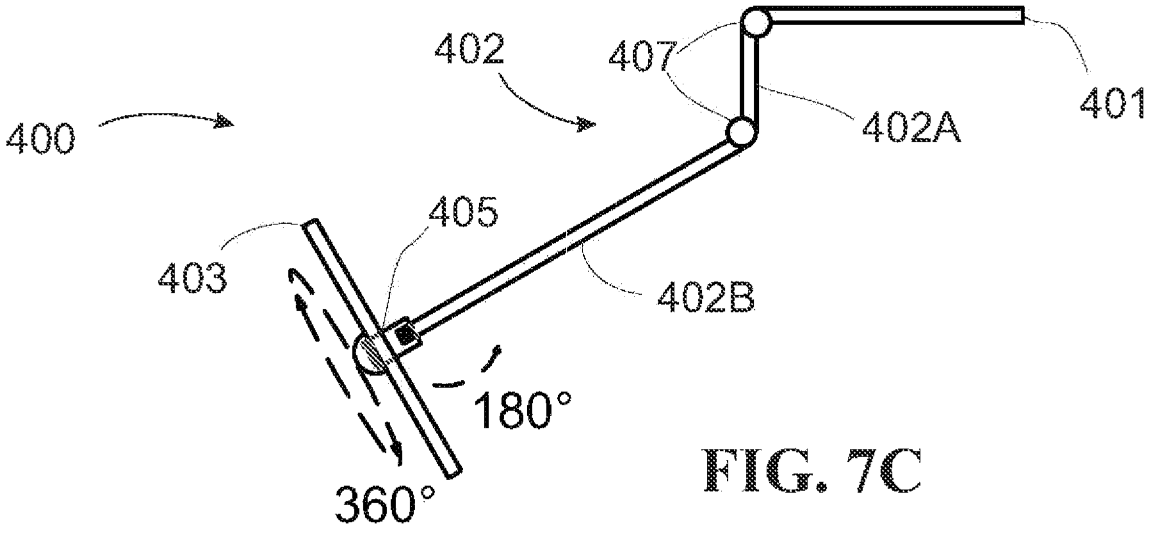
FIG. 7C is a top view of the alternative latch member according to an embodiment of the present invention.

FIGS. 7A-C illustrate various views of an alternative latch member 400 according to an embodiment of the present invention. Referring now to FIGS. 7A-C, the alternative latch member 400 is illustrated. The alternative latch member provides an additional solution, enabling a configurable latch member to clear any door frame, jamb, casing etc. when positioning the invention for use. In this embodiment, the alternative latch member 400 comprises a rectangular frame member 401, a horizontal member 402, and a mounting member 403. Similarly, to the first embodiment, the horizontal member comprises a distal member 402A and a proximal member 402B and the mounting member 403 comprises holes such that the mounting member 403 may be fastened to the rear side of the bag as illustrated in FIG. 2. In this embodiment, the proximal member 402B is hingedly attached to the distal member 402A and the distal member 402A is hingedly attached to the rectangular frame member 401. Hinges 407 enable the rotation of the distal member 402A, wherein hinge 405 enables the rotation of the proximal member 402B. Hinge 405 is the same as the first embodiment, enabling 360 degree rotation of the axial and up to 180 degree rotation in relation of the mounting member.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An anti-theft delivery bag comprising:

a bag having a front side and a rear side, the front side having an opening providing access to an interior portion of the bag;

a fastener mechanism positioned along the opening, the fastener mechanism configured to alternate between an opened position providing access to the interior portion and a closed position preventing access to the interior portion;

a locking device configured to lock the fastener mechanism in the closed position;

a strap configured to position the anti-theft delivery bag on a door handle; and, a latch member attached to the rear side, the latch member having a rectangular frame configured to be positioned against a mortise plate within a door jamb of a door, such that the latch member and the anti-theft delivery bag are secured in position when the door is closed preventing theft of the bag, wherein a top frame member of the rectangular frame is configured to rest on a latch or deadbolt extending from the mortise plate of the door.

2. The anti-theft delivery bag of claim 1, wherein the fastener mechanism is a zipper.

3. The anti-theft delivery bag of claim 1, wherein the locking device is a fingerprint lock.

4. The anti-theft delivery bag of claim 1, wherein the bag is constructed from a durable waterproof material.

5. The anti-theft delivery bag of claim 1, wherein the latch member further comprises:

a mounting member configured to be fastened to the rear side of the bag;

a horizontal member positioned between the mounting member and the rectangular frame, wherein the horizontal member is hingedly connected to the mounting member enabling 180 degree rotation in relation to the mounting member and 360 degree swivel around its axis.

6. The anti-theft delivery bag of claim 5, wherein the horizontal member comprises a distal member and a proximal member, wherein the distal member is angled 60 degrees From the plane of the proximal member.

7. The anti-theft delivery bag of claim 6, wherein the latch member further comprises a sleeve attached to an end of the distal member, wherein the sleeve is positioned around a vertical frame member of the rectangular member, enabling the horizontal member to travel up and down the vertical frame member.

8. The anti-theft delivery bag of claim 5, wherein the horizontal member comprises a distal member and a proximal member, wherein the proximal member is hingedly attached to the distal member and the distal member is hingedly attached to the rectangular frame.

9. The anti-theft delivery bag of claim 1, wherein the latch member is constructed from steel.

10. An anti-theft delivery bag comprising:

a bag having a front side and a rear side, the front side having an opening providing access to an interior portion of the bag;

a fastener mechanism positioned along the opening, the fastener mechanism configured to alternate between an opened position providing access to the interior portion and a closed position preventing access to the interior portion;

a locking device configured to lock the fastener mechanism in the closed position;

a strap configured to position the anti-theft delivery bag on a door handle;

a latch member attached to the rear side, the latch member having a rectangular frame and horizontal member, wherein the rectangular frame is configured to rest on a latch or deadbolt extending from a mortise plate within a door jamb of a door, such that the rectangular frame and the anti-theft delivery bag are secured in position when the door is closed preventing theft of the bag; wherein the latch member further comprises:

a mounting member configured to be fastened to the rear side of the bag;

a horizontal member positioned between the mounting member and the rectangular frame, wherein the horizontal member is hingedly connected to the mounting member enabling 180 degree rotation in relation to the mounting member and 360 degree swivel around its axis;

wherein the horizontal member comprises a distal member and a proximal member, wherein the proximal member is hingedly attached to the distal member and the distal member is hingedly attached to the rectangular frame. and, the horizontal member is shaped and configurable to clear the door jamb.

11. The anti-theft delivery bag of claim 10, wherein the fastener mechanism is a zipper.

12. The anti-theft delivery bag of claim 10, wherein the locking device is a fingerprint lock.

13. The anti-theft delivery bag of claim 10, wherein the bag is constructed from a durable waterproof material.

14. The anti-theft delivery bag of claim 1, wherein the horizontal member comprises a distal member and a proximal member, wherein the distal member is angled 60 degrees From the plane of the proximal member.

15. The anti-theft delivery bag of claim 14, wherein the latch member further comprises a sleeve attached to an end of the distal member, wherein the sleeve is positioned around a vertical frame member of the rectangular member, enabling the horizontal member to travel up and down the vertical frame member.

16. The anti-theft delivery bag of claim 10, wherein the latch member is constructed from steel.

* * * * *